Oct. 24, 1967 A. M. GORDON 3,349,254

SIGNAL COMBINING CIRCUIT

Filed April 14, 1965 2 Sheets-Sheet 1

INVENTOR
A. M. GORDON
BY G. E. Hirsch Jr.
ATTORNEY

Oct. 24, 1967 A. M. GORDON 3,349,254

SIGNAL COMBINING CIRCUIT

Filed April 14, 1965 2 Sheets-Sheet 2

United States Patent Office 3,349,254
Patented Oct. 24, 1967

3,349,254
SIGNAL COMBINING CIRCUIT

Alan M. Gordon, Matawan Township, Monmouth, N.J., assignor to Bell Telephone Laboratories, Incorporated, New York, N.Y., a corporation of New York
Filed Apr. 14, 1965, Ser. No. 448,147
6 Claims. (Cl. 307—88.5)

Figure 1:
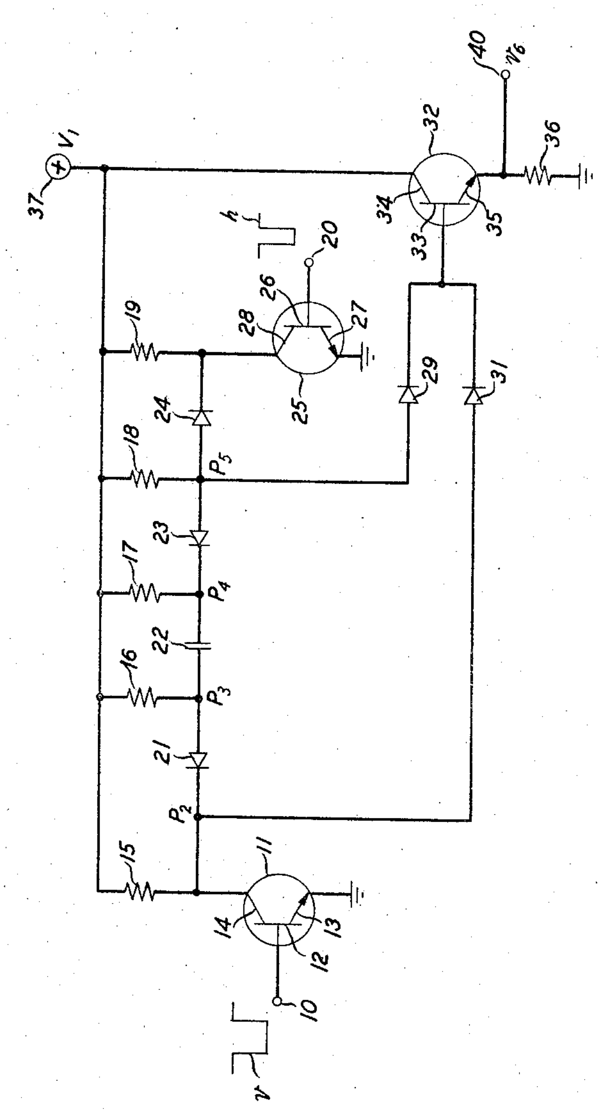

This invention pertains to signal combining circuits and, more particularly, to circuits for selectively combining discrete pulse trains. It finds especial use in the field of video communications.

In pulse and digital systems, for example, television, radar and digital computers, to mention just a few, it is quite often necessary to combine two distinct signals to form a composite signal. A typical circuit for performing this function is the buffer or mixing circuit which permits a number of pulse sources to be connected to a common load. However, when signals are combined in a straightforward manner, pulse identity is often lost due to the coincidence of two or more pulses. In many systems, the initiation or cessation of a pulse has vital information bearing qualities. In particular, the trailing edge of a pulse often is used as a "marker" or timing indication. If two pulse trains are combined indiscriminately, overlapping of pulses is bound to occur producing an apparent elongation of the overlapped pulse. The resulting shift in time of the trailing edge of the pulse produces an error which may, dependent on the system, have serious ramifications.

A primary object of this invention, therefore, is to selectively combine distinct pulse trains without suffering a loss in pulse identity.

Another object is to combine pulses in a manner such that the vital information bearing quality of each individual pulse is retained.

These and other objects are accomplished, in accordance with the present invention, by temporarily suppressing the magnitude of the pulses of one pulse train when proximately preceded in time by the pulses of another train. The cessation of a pulse of one train is used to establish an instantaneous drop in voltage, for example, across a capacitor. The magnitude of the capacitor voltage is used as a reference level for clamping the pulses of the other train. Thus, the magnitudes of those pulses proximately preceded by the termination of a pulse of the first train are clamped to an exponentially increasing voltage as the capacitor recharges. The suppressed pulses may then be combined with the unsuppressed pulses in a conventional OR circuit.

These and further features and objects of this invention, its nature and various advantages will become apparent upon consideration of the attached drawings and of the following detailed description of the drawings.

Figure 2:
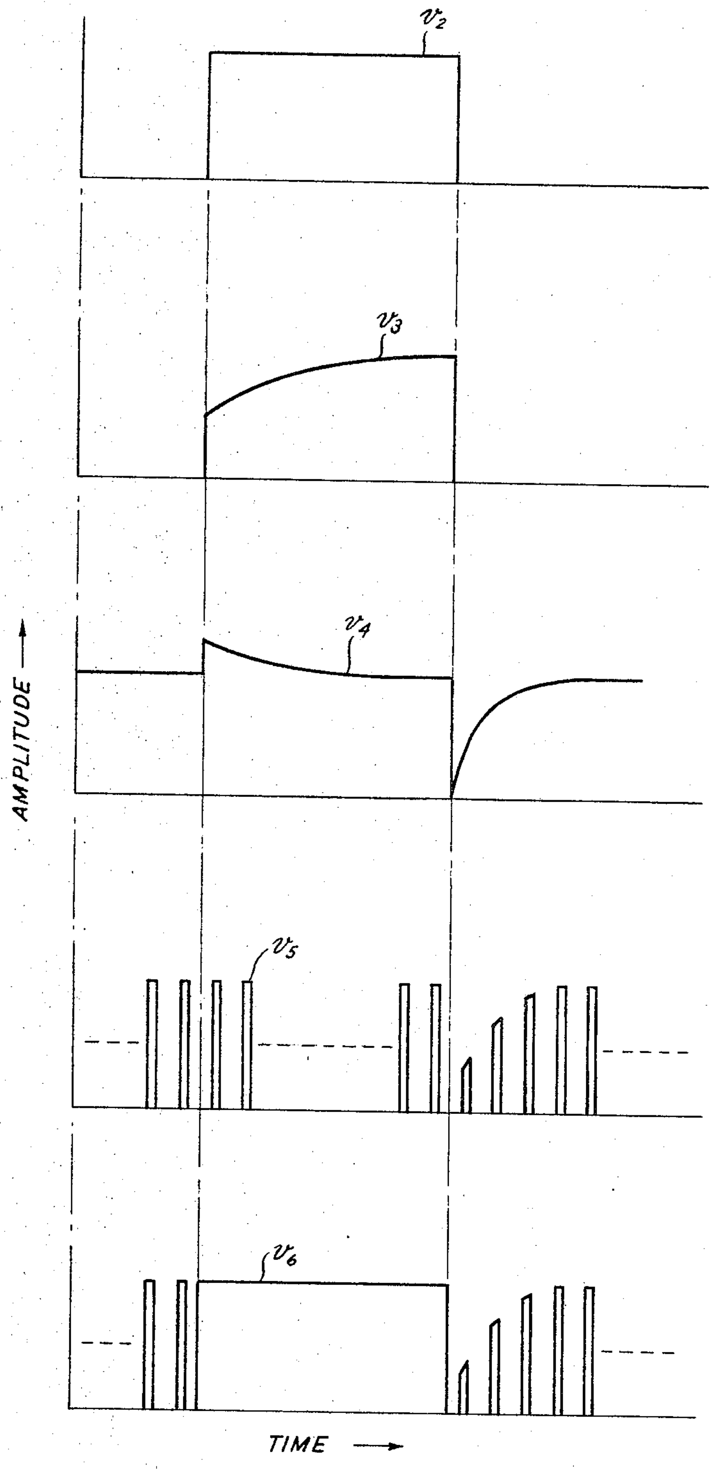

In the drawing:

FIG. 1 is a schematic circuit diagram illustrating a preferred embodiment of the invention; and FIG. 2 is a composite set of waveforms of various signals occurring during typical operation of the circuit depicted in FIG. 1.

Video systems quite often require that horizontal and vertical synchronizing (sync) signals be combined prior to the application of the resulting composite signal to a video amplifier or other video circuit. In one such system, particularly useful in closed circuit television, the terminating portion of the vertical synchronization pulse, i.e., its trailing edge, is used as a trigger for the commencement of the vertical sweep of the beam in the cathode ray tube. Accordingly, to assure accurate synchronization it is essential that the step marking the end of the vertical synchronizing pulse be detected as reliably and accurately as possible. Since a conventional mixing circuit simply combines vertical and horizontal sync pulses together, the trailing edge of a vertical pulse is not always discernible; it may be coincident in time with a horizontal pulse. In such an event, the vertical pulse appears elongated, and the start of the vertical sweep is proportionally delayed. For this reason, in accordance with the practice of the present invention, those horizontal sync pulses proximate to the termination of a vertical sync pulse are suppressed in magnitude prior to combination in a conventional OR circuit.

FIG. 1 shows a suitable circuit, in accordance with the invention, for carrying out the selective suppression of pulses in one train in response to the occurrence of specified pulses in the other train. In the circuit of FIG. 1, two negative-going pulses which represent, for example, vertical and horizontal sync signals of two distinct pulse trains are applied, respectively, to terminals 10 and 20. Under normal circumstances, pulses applied at terminal 10 are transmitted through transistor amplifier 11 and are applied by way of diode 31 to base 33 of transistor 32. Similarly, pulses applied to terminal 20 are transmitted through transistor amplifier 25 and diodes 24 and 29 to transistor amplifier 32. Diodes 29, 31 and transistor 32 together constitute an OR gate and allow pulses from either train to appear across resistor 36. A composite of the two pulse trains, illustrated as waveform $v_6$ in FIG. 2, is therefore developed across resistor 36 and appears at output terminal 40.

Prior to the application of a negative-going vertical sync pulse to base 12 of transistor 11, transistor 11 is in a saturated state. Bias means for establishing this state are well known and are not depicted in the drawing. When transistor 11 is saturated, the momentary potentials $v_2$ and $v_3$ at points $P_2$ and $P_3$ are approximately at the emitter potential, i.e., ground potential, as a result of current drawn through unidirectional current device 21, for example, a solid state diode. At the same time, potential $v_4$ at point $P_4$ is approximately equal to the potential $V_1$ of source 37. Diode 23 is nonconductive since potential $v_5$ at point $P_5$ can never exceed the supply voltage $V_1$. Under these conditions, $v_5$ follows the signal on the collector 28 of transistor 25 in response to horizontal synch pulses applied to the base of transistor 25 from terminal 20. Horizontal sync information is therefore transmitted unaffected through the OR gate circuit comprising diodes 29, 31 and transistor 32. The voltages $v_2$, $v_3$ et cetera, referred to in the discussion of the circuit of FIG. 1 are shown in FIG. 2.

Upon the application of a vertical sync signal to base 12, transistor 11 becomes nonconductive and the collector 14 rises in potential. Diode 21 is therefore rendered nonconductive so that voltages $v_3$ and $v_4$ at points $P_3$ and $P_4$ each experience a step increase in voltage determined by resistors 16 and 17. Charging current flows through resistors 16 and 17 and capacitor 22, thus causing voltages $v_3$ and $v_4$ to approach each other in an exponential manner. At the termination of each vertical sync pulse, potentials $v_3$ and $v_4$ are approximately equal to the source potential $V_1$; there is essentially no charge on capacitor 22. During this time, diodes 21 and 23 are backbiased and therefore not not affect the inputs to the OR gate.

At the termination of the vertical sync pulse, transistor 11 saturates and collector 14 experiences a step decrease in voltage. This step brings collector 14 essentially to ground potential. The same step decrease in voltage also occurs to voltage $v_3$ due to the conduction of diode 21. Instantaneously, voltage $v_4$ also decreases to approximately ground potential. Current then flows through resistor 17 to charge capacitor 22 and return voltage $v_4$ to the supply potential. Because of diode 23, potential $v_5$ is clamped to the voltage $v_4$ at point $P_4$. It will not exceed this voltage as long as diode 23 is in a state of conduction.

If, proximate in time to the above-mentioned circuit operation, a horizontal sync pulse is applied to base 26 of transistor 25, collector 28 will rise to potential $V_1$ of source 37, thereby to backbias diode 24. Thus horizontal voltage pulses of a magnitude equal to $V_1$ are not applied to diode 29; instead the magnitude of these pulses is limited to the potential appearing at $P_5$. The net result is that horizontal sync pulses preceded by vertical sync pulses are limited in amplitude to follow an exponentially rising envelope. Waveform $v_5$ of FIG. 2 is illustrative of this condition.

It will thus be observed that by the practice of this invention, horizontal pulses approximately coincident in time with the termination of a vertical sync pulse will be suppressed. As shown in FIG. 2, only two or three horizontal pulses are modified in amplitude. Conventional circuitry in a video system, for example a video amplifier, introduces some restoration, so that usually only the first horizontal retrace line goes unblanked in the receiver. In accordance with normal practice, the first horizontal line occurs on the masked portion of the picture tube. Thus no deleterious effects are introduced by the operation of this invention.

It is to be understood that the embodiments shown and described herein are merely illustrative, and that further modifications of this invention may be implemented by those skilled in the art without departing from the scope and spirit of the invention. For example, though the operation of the present invention has been explained in the context of a video communication system, it will of course be apparent to those skilled in the art that the teachings of this invention have application in a multitude of pulse combining systems.

What is claimed is:

1. A combining circuit for selectively mixing two discrete pulse trains comprising,
   logic means,
   means for applying to said logic means a first train of pulses,
   means for applying to said logic means a second train of pulses,
   energy storage means,
   means for varying the potential of said energy storage means in an exponential manner for a predetermined time after the cessation of each pulse of said first train of pulses,
   and swtching means for altering the magnitude of the pulses of said second train in accordance with the varying potential of said energy storage means.

2. A mixing circuit comprising, in combination,
   a source of a first train of pulses,
   a source of a second train of pulses,
   a capacitor,
   first diode means for applying the pulses of said first train to said capacitor,
   means for charging said capacitor in an exponential manner upon the cessation of each pulse of said first train,
   second diode means for clamping the amplitude of the pulses of said second train to the potential appearing across said charging capacitor,
   and logic means for combining the pulses of said first train and the clamped pulses of said second train.

3. Means for selectively applying the pulses of two discrete pulse trains to an OR logic gate comprising, in combination,
   a source of a first train of pulses,
   a source of a second train of pulses,
   a capacitor,
   first switching means for periodically applying the pulses of said first train to said capacitor,
   means for instantaneously discharging said capacitor upon the cessation of each of the pulses of said first train,
   means responsive to the instantaneous discharge of said capacitor for increasing the potential of said capacitor in an exponential manner for a predetermined interval of time,
   and switching means for selectively altering the magnitude of the pulses of said second train in accordance with the exponentially increasing potential of said capacitor during said predetermined intervals of time.

4. A mixing circuit comprising, in combination,
   a source of a first train of pulses,
   a source of a second train of pulses,
   a capacitor,
   first diode means responsive to the cessation of each pulse of said first train for instantaneously discharging said capacitor,
   a source of fixed potential,
   means responsive to the instantaneous discharge of said capacitor for charging said capacitor from said source of fixed potential,
   second diode means responsive to the charging of said capacitor for selectively suppressing the amplitude of the pulses of said second train by clamping the magnitude of said pulses to the potential of said charging capacitor,
   and logic gate means for combining the pulses of said first train and the suppressed pulses of said second train.

5. A system for combining diverse trains of pulses comprising,
   a source of a first train of pulses,
   a source of a second train of pulses,
   means responsive to the trailing edge of each of the pulses of said first train for developing an exponentially increasing voltage,
   means for clamping the magnitude of said pulses of said second train to said exponentially increasing voltage,
   and logic means for combining the pulses of said first train with the pulses of said second train.

6. A system for selectively mixing diverse trains of pulses comprising,
   a source of a first train of pulses,
   a source of a second train of pulses,
   capacitor means responsive to the occurrence of each of the pulses of said first train for developing an exponentially increasing voltage,
   diode means for constraining the magnitude of said pulses of said second train to follow said exponentially increasing voltage,
   and logic means for combining the pulses of said first train with the pulses of said second train.

No references cited.

ARTHUR GAUSS, *Primary Examiner.*

B. P. DAVIS, *Assistant Examiner.*